United States Patent [19]

Ejiri et al.

[11] Patent Number: 4,652,500
[45] Date of Patent: Mar. 24, 1987

[54] MAGNETIC RECORDING MEDIUM

[75] Inventors: Kiyomi Ejiri; Shigeo Komine, both of Odawara, Japan

[73] Assignee: Fuji Photo Film Co., Ltd., Kanagawa, Japan

[21] Appl. No.: 848,168

[22] Filed: Apr. 4, 1986

[30] Foreign Application Priority Data

Apr. 4, 1985 [JP] Japan .................................. 60-72212
Apr. 4, 1985 [JP] Japan .................................. 60-72213

[51] Int. Cl.$^4$ .............................................. G11B 5/70
[52] U.S. Cl. .................................. 428/695; 252/62.54; 427/128; 428/323; 428/328; 428/329; 428/694; 428/900
[58] Field of Search ............... 428/694, 695, 900, 328, 428/329, 323; 252/62.54; 360/134–136; 427/128

[56] References Cited

U.S. PATENT DOCUMENTS

4,455,345  6/1984  Miyatuka .............................. 428/698
4,465,737  8/1984  Miyatuka .............................. 428/900

Primary Examiner—Ellis P. Robinson
Attorney, Agent, or Firm—Gerald J. Ferguson, Jr.; Michael P. Hoffman; Ronni S. Malamud

[57] ABSTRACT

A magnetic recording medium such as a magnetic recording disk or a magnetic recording tape comprising a nonmagnetic support and a magnetic recording layer provided on said support, said magnetic recording layer comprising a nonmagnetic inorganic powder and a ferromagnetic metal powder of a specific surface area in the range of 35–65 m$^2$/g dispersed in a binder, which is characterized in that said magnetic recording layer contains an alkyl ester of a fatty acid and an alkoxyalkyl ester of a fatty acid in amounts in the ranges of 5–15 wt. % and 0.5–10 wt. %, respectively, based on the amount of the ferromagnetic metal powder.

13 Claims, 3 Drawing Figures

MAGNETIC RECORDING MEDIUM

BACKGROUND OF THE INVENTION

1. Field of the invention

The present invention relates to a magnetic recording medium in the form of disk or continuous tape which comprises a nonmagnetic support and a magnetic recording layer.

2. Description of prior arts

A magnetic recording disk has been recently employed as a recording medium for a computer or a word processer. With the practical use of an electronic camera in recent years, the magnetic recording disk (i.e., magnetic sheet disk) of small size is standardized and has been employed as a recording medium for the electronic camera.

The magnetic recording disk basically comprises a nonmagnetic support and a magnetic recording layer provided on a surface of the support, and has a similar construction of layers to that of a magnetic recording tape such as an audio-tape and a video-tape. However, the magnetic recording disk generally has magnetic recording layers on both surfaces of the support, and in this point, the magnetic recording disk is different from the magnetic recording tape. In addition to the difference of shape and construction of layers, there is a large difference in the manner of usage between the magnetic recording disk and the magnetic recording medium in the form of tape (i.e., a magnetic recording tape). Accordingly, the function required for the magnetic recording disk is largely different from that required for the magnetic recording tape.

In more detail, as for the magnetic recording disk, a magnetic head runs repeatedly on the same surface of the disk in contact with the surface of the disk to record and regenerate information, and any information which has been recorded in the disk is not allowed to drop off the disk under such severe conditions. From these viewpoints, it is necessary that the magnetic recording disk has much higher physical resistnace in the running (that is, rotational or revolutional) operation than that of the magnetic recording tape.

Further, as the recording density required for the recording media tends to be prominently higher in recent days, the magnetic recording disk is likewise required to have higher recording density. That is, the magnetic recording disk needs to be further improved in the electromagnetic conversion characteristics thereof.

Since the magnetic sheet disk for the electronic camera is required to show high resolution almost the same as that of the conventional photography using silver salt, the electromagnetic conversion characteristics thereof are particularly required to be highly enhanced, and the allowance for dropping the recorded and regenerated image off the disk (i.e., drop-out of image) is under severe restriction. For instance, the magnetic sheet disk having a disk diameter of approx. 5 cm is required to record an amount of image information almost corresponding to 50 photographs, and hence the magnetic sheet disk for the electronic camera needs to have a recording capacity of much higher density as compared with the conventional magnetic recording disk.

As a measure for improving the electromagnetic characteristics of the magnetic recording disk, Japanese Patent Provisional Publication No. 58(1983)-122623 proposes that a ferromagnetic powder having a coercive force of not less than approx. 1000 Oe and a specific surface area of approx. $25 \geqq 70$ m$^2$/g (that is, ferromagnetic metal powder) be employed in a magnetic recording medium.

While a ferromagnetic alloy powder is preferably employed as the ferromagnetic powder for the magnetic recording medium because of its excellent electromagnetic conversion characteristics, there is a drawback that the ferromagnetic alloy powder is low in hardness and easily abraded in the course of running in contact with a magnetic head.

The magnetic sheet disk for the electronic camera is generally employed under such severe conditions that the same surface of the disk is kept in contact with a magnetic head under revolution (or rotation) at a rate of approx. 3,600 rpm. Under such severe conditions, the disk is required to show physical resistance in the rotational operation enough to endure rotations of at least 15 million times. In addition, almost no drop-out of recorded image information is allowed even under such severe conditions. Such high electromagnetic conversion characteristics have been hardly required for the conventional magnetic recording media.

SUMMARY OF THE INVENTION

It is an object of the present invention to provide a magnetic recording medium in the form of a disk or a continuous tape which is excellent in both of the electromagnetic conversion characteristics and the physical resistance in the rotational operation (i.e., resistance to abrasion).

In one aspect, the invention has an object to provide an magnetic recording disk having the electromagnetic conversion characteristics and physical resistance suitable for a magnetic sheet disk employed in an electronic camera.

There is provided by the present invention a magnetic recording medium comprising a nonmagnetic support and a magnetic recording layer provided on said support, said magnetic recording layer comprising a nonmagnetic inorganic powder and a ferromagnetic metal powder of a specific surface area in the range of 35–65 m$^2$/g dispersed in a binder, which is characterized in that said magnetic recording layer contains an alkyl ester of a fatty acid and an alkoxyalkyl ester of a fatty acid in amounts in the range of 5–15 wt.% and 0.5–10 wt.%, respectively, based on the amount of the ferromagnetic metal powder.

The above-metnioned magnetic recording medium in the form of a disk (magnetic recording disk) is preferably prepared by a process which comprises coating a magnetic paint comprising a ferromagnetic metal powder of a specific surface area in the range of 35–65 m$^2$/g, a binder, a solvent, an alkyl ester of a fatty acid in an amount of in the range of 5–15 wt.% and an alkoxyalkyl ester of a fatty acid in an amount in the range of 0.5–10 wt.%, the amount being based on the amount of the ferromagnetic metal powder, on a nonmagnetic support to form a coated layer, and drying the coated layer without subjecting it to magnetic orienting treatment.

The magnetic recording medium of the present invention shows high electromagnetic conversion characteristics and high physical resistance in the running operation (i.e., resistance to abrasion) by employing the specific ferromagnetic metal powder in combination with the specific lubricant.

A magnetic recording medium of the invention shows high electromagnetic conversion characteristics and physical resistance especially suitable for the magnetic sheet disk of an electronic camera. A magnetic recording medium of the invention also advantageously takes a form of a continuous tape such as an audio tape or a video tape.

DETAILED DESCRIPTION OF THE INVENTION

A magnetic recording medium of the invention essentially comprises a nonmagnetic support and a magnetic recording layer provided on one or both surfaces of the support. The magnetic recording layer comprises a ferromagnetic metal powder dispersed in a binder.

There is not specific limitation on the nonmagnetic support employable in the present invention.

Material of the nonmagnetic support is not particularly limited and can be selected, for example, from polyethylene terephthalate, polypropylene, polycarbonate, polyethylene naphthalate, polyamide, polyamideimide, polyimide and metallic foils such as aluminum foil and stainless steel foil. The thickness of the support for the disk-type recording material generally is in the range of 12–80 μm and preferably in the range of 20–75 μm. The thickness of the support for the continuous tape-type recording material generally is in the range of 3–50 μm and preferably in the range of 5–30 μm.

The magnetic recording medium of the invention has a magnetic recording layer containing the specific ferromagnetic metal powder on the nonmagnetic support, as described above. In a disk-type magnetic recording medium, that is, a magnetic recording disk, the magnetic recording layer is generally provided on both surfaces of the nonmagnetic support. In a continuous tape-type magnetic recording medium, the magnetic recording layer is generally provided on one surface of the support. An exposed surface of the support may be provided with a back layer (backing layer).

The ferromagnetic metal powder to be contained in the magnetic recording layer of the magnetic recording medium according to the invention has a specific surface area (S-BET) in the range of 35–65 m²/g.

If the specific surface area of the ferromagnetic metal powder is less than 35 m²/g, the electromagnetic conversion characteristics of the resulting magnetic recording medium are not sufficiently enhanced. If the specific surface area thereof exceeds 65 m²/g, the physical resistance of the resulting recording layer becomes poor.

For the magnetic recording disk, the ferromagnetic metal powder preferably has a saturation magnetic moment ($\sigma$s) of not less than 105 emu/g, more preferably in the range of 110–155 emu/g and a coercive force of not less than 1,000 Oe, more preferably 1,200–1,400 Oe. The saturation magnetic moment means a value measured by a vibrating sample magnet meter (VSM) in the external magnetic field (Hm) of 10 kOe.

As the ferromagnetic metal powder, there can be mentioned a ferromagnetic alloy powder containing a metal component of at least 75 wt.% in which at least 80 wt.% of the metal component comprises at least one ferromagnetic metal or metal alloy (e.g., Fe, Co, Ni, Fe-Co, Fe-Ni, Co-Ni, or Co-Ni-Fe) and the remaining metal component, if present, comprises other atom(s) (e.g., Al, Si, S, Sc, Ti, V, Cr, Mn, Cu, Zn, Y, Mo, Rh, Pd, Ag, Sn, Sb, Te, Ba, Ta, W, Re, Au, Hg, Pb, Bi, La, Ce, Pr, Nd, B, or P). The ferromagnetic metal component may contain a small amount of water, hydroxide, or oxide. These ferromagnetic metal powders are already known, and can be prepared by known methods. The ferromagnetic metal powder employable in the invention can be obtained by first preparing a ferromagnetic metal powder according to the known method, then adjusting the saturation magnetic moment and finally classifying the resulting powder based on the powder size. The saturation magnetic moment can be adjusted by a known method such as a method of varying the oxidation state of the surface of the ferromagnetic metal powder or a method of varying the composition of metal.

There is no specific limitation on the shape of the ferromagnetic metal powder employable in the invention, and normally used is needle shape, grain shape, dice shape, rice shape or plate shape.

The magnetic recording layer of the magnetic recording medium according to the invention contains generally a nonmagnetic inorganic powder preferably having a Mohs' scale of hardness of not less than 6 in an amount of 1–15%, more specifically 1–10%, by weight based on the amount of the ferromagnetic metal powder. Examples of the nonmagnetic inorganic powder having a Mohs' scale of hardness of not less than 6 include cromic oxide (e.g. $Cr_2O_3$), α-alumina and α-iron oxide (e.g. $Fe_2O_3$). In the invention, there is preferably employed a nonmagnetic inorganic powder having a Mohs' scale of hardness of not less than 8 such as cromic oxide and α-alumina. The nonmagnetic inorganic powder preferably has a mean diameter in the range of 0.2–0.8 μm, more preferably 0.3–0.5 μm.

The nonmagnetic inorganic powder may be not incorporated into the magnetic recording layer of the magnetic recording disk.

A magnetic recording medium of the invention contains in the magnetic recording layer a combination of the specific amounts of an aklkylester of a fatty acid and an alkoxyalkylester of a fatty acid as lubricant.

The fatty acid esters in combination serves mainly as lubricant for the magnetic recording layer containing the ferromagnetic metal powder to improve physical resistance of the recording layer in the running operation.

The alkylester of a fatty acid of the invention preferably has the following formula (1):

wherein $R^1$ is a saturated or unsaturated alkyl group having 12–24 carbon atoms and $R^2$ is a saturated or unsaturated alkyl group having 2–8 carbon atoms. The alkyl chain of the ester may be straight or branched.

Examples of the alkyl ester of a fatty acid include methyl ester, ethyl ester, propyl ester, butyl ester and isoamyl ester of a saturated or unsaturated fatty acid such as lauric acid, capric acid, erucic acid, cetoleic acid, elaidic acid, oleic acid, myristic acid, pentadecylic acid, heptadecylic acid, stearic acid, nonadecanoic acid, arachic acid, behenic acid and lignoceric acid. The fatty acid ester can be employed singly or in combination.

The alkoxyalkylester of a fatty acid of the invention preferably has the following formula (2):

wherein $R^3$ is a saturated or unsaturated alkyl group having 12-24 carbon atoms, $R^4$ is a saturated or unsaturated alkyl group having 2-6 carbon atoms and $R^5$ is a saturated or unsaturated alkyl group having 2-8 carbon atoms. The alkoxyalkyl chain of the ester may be straight or branched.

Examples of the alkoxyalkyl ester of a fatty acid include ethoxyethyl ester, ethoxyisopropyl ester, ehtoxybutyl ester, ethoxyisoamyl ester, propoxyethyl ester, propoxyisopropyl ester, propoxybutyl ester, propoxyisoamyl ester, butoxyethyl ester, butoxyisopropyl ester, butoxybutyl ester and butyxoyisoamyl ester of a saturated or unsaturated fatty acid such as lauric acid, capric acid, erucic acid, cetoleic acid, elaidic acid, oleic acid, myristic acid, pentadecylic acid, heptadecylic acid, stearic acid, nonadecanoic acid, arachic acid, behenic acid and lignoceric acid. The fatty acid ester can be employed singly or in combination.

In the invention, the alkyl ester of a fatty acid and the alkoxyalkyl ester of a fatty acid are incorporated into the magnetic recording layer in amounts in the ranges of 5-15 wt.% and 0.5-10 wt.%, respectively, based on the amount of the ferromagnetic metal powder. The alkyl ester of a fatty acid and said alkoxyalkyl ester of a fatty acid are preferably incorporated into the magnetic recording layer in amounts in the ranges of 7-13 wt.% and 0.5-5 wt.% respectively, based on the amount of the ferromagnetic metal powder.

The amount of the alkyl ester of a fatty acid preferably is larger than the amount of the alkoxyalkyl ester of a fatty acid. Particularly preferred is that the amount of the alkyl ester of a fatty acid is as much as twice or more larger than the amount of the alkoxyalkyl ester of a fatty acid.

Other liquid lubricants such as an aliphatic alcohol and/or solid lubricants such as carbon black can be also employed in combination with the fatty acid esters in the invention.

The amount of the solid lubricant, if employed, is appropriately selected from the range of 0.02 to 5% by weight based on the amount of ferromagnetic metal powder. The solid lubricant preferably contains carbon black. Examples of the solid lubricant include carbon black, graphite and talc. Particularly preferred is carbon black, because it shows not only excellent lubricating action but also high antistatic properties. A solid lubricant having a mean diameter of 0.015 to 0.2 μm is preferably employed in the invention.

The above-described ferromagnetic metal powder, nonmagnetic inorganic powder and fatty acid esters are dispersed in a binder to prepare a magnetic recording layer.

The binder employable in the formation of the magnetic recording layer of the invention can be selected from known resins such as thermoplastic resins, thermosetting resins, and reactive resins. These resins can be employed singly or in combination.

The thermoplastic resin employable in the invention generally has a mean molecular weight of 10,000-200,000 and a polymerization degree of approx. 200-2,000. Examples of the thermoplastic resin include vinyl chloride/vinyl acetate copolymer resins, acrylic resins, cellulose derivative resins, a variety of thermoplastic resins of synthetic rubber type, polyurethane resins, polyvinyl fluoride resins, polyamide resins, polyvinyl butylate resins, styrene/butadiene copolymer resins and polystyrene resins.

The thermosetting resin or the reactive resin employable in the invention generally has a mean molecular weight of not more than 200,000 in the state of a component of a coating dispersion, and the molecular weight of those resins becomes infinity after being coated through condensation reaction or addition reaction. Preferably employable thermosetting resin is one which does not soften or melt under heating in the course of hardening. Examples of such resins include phenol/formalin/novolak resin, phenol/formalin/resol resin, phenol/furfural resin, xylene/formalin resin, urea resin, melamine resin, drying oil alkyd resin, phenolic resin modified alkyd resin, maleic resin modified alkyd resin, unsaturated polyester resin, a mixture of epoxy resin and hardening agent, isocyanate polyether humid-setting resin, a mixture of polyisocyanate and polyurethane resin, and a mixture of polyisocyanate prepolymer and a resin having active hydrogen. If a mixture of the above-mentioned vinyl chloride/vinyl acetate copolymer and a polyurethane resin is used with polyisocyanate compound as a binder, the magnetic recording layer of the invention can be more hardened.

The amount of the binder is generally in the range of 10 to 100 parts by weight, preferably in the range of 15 to 50 parts by weight, per 100 parts by weight of the ferromagnetic metal powder.

The magnetic recording medium of the present invention can be produced by the following procedure.

In the first place, the above-described ferromagnetic metal power, nonmagnetic inorganic powder, fatty acid esters and a binder are kneaded with an appropriate solvent to prepare a magnetic paint (or dispersion). The solvent employable in the invention is a known solvent used for the preparation of the conventional magnetic paint such as methyl ethyl ketone and cyclohexanone. The kneading procedure can be carried out by the conventional method using apparatus employed for the preparation of the magnetic paint. The order of addition of each component for the preparation of a magnetic paint can be appropriately selected.

In the preparation of the magnetic paint employable in the invention, other additives such as a dispersing agent and an antistatic agent can be also employed in combination with the above-described components.

In the second place, the magnetic paint prepared as above is applied onto one or both surfaces of the nonmagnetic support. Generally, a magnetic recording layer is formed by applying the magnetic paint directly on the nonmagnetic support, but it is also possible to provide an adhesive layer or a subbing layer between the magnetic paint layer and the nonmagnetic support. The applying procedure can be performed according to the conventional method.

The magnetic recording layer provided on the surfaces of the nonmagnetic support has a thickness (thickness in dry state) generally in the range of approx. 0.5-10 μm, preferably in the range of 1.5-7.0 μm.

In the conventional process of the preparation of a magnetic recording medium, a magnetic recording layer provided on a nonmagnetic support is generally subjected to a drying process after having been subjected to magnetic treatment of orienting a ferromagnetic metal powder contained in the magnetic recording layer. This orienting procedure is applied in the longitudinal direction in the case of a magnetic recording tape and at random or in the circumferential direction in the case of a magnetic recording disk.

In the case of a magnetic recording disk, the orientation ratio (i.e., maximum value of squareness ratio/minimum value of squareness ratio) is ought to be not less than 0.85. Accordingly, in the conventional process of a magnetic recording disk, a magnetic recording layer is necessarily subjected to the magnetic orienting process. It is, however, disadvantageous to apply the orienting treatment to the magnetic recording layer, because such treatment makes the surface of the recording layer rough, whereby the condition of contact of the recording layer to a magnetic head is made poor. Such poor contact between the recording layer and the magnetic head inevitably results in deterioration of the electromagnetic conversion characteristics. The deterioration of electromagnetic conversion characteristics is undesirable particularly in the case of a magnetic sheet disk for an electronic camera, because the deterioration brings about great adverse effect on a regenerated image.

It has been now discovered that the ferromagnetic metal powder in the magnetic paint employed for the preparation of the magnetic recording medium of the invention is remarkably well dispersed. Especially, in the case of preparing a magnetic recording disk using the magnetic paint containing the specific fatty acid esters in combination according to the invention, the orienting treatment is not required to obtain a well oriented magnetic recording layer, and a magnetic recording layer with satisfactorily oriented ferromagnetic metal powder therein can be produced without having been subjected to the orienting treatment. Therefore, the resulting magnetic recording disk shows improved electromagnetic conversion characteristics.

If necessary, a smoothing process is further carried out. The magnetic recording medium having been subjected to the process such as the smoothing process is subsequently cut to give a medium in the form of disk or continuous tape.

A magnetic recording disk according to the process as described above not only shows improved electromagnetic conversion characteristics but also is remarkably resistant to rotation (running or revolution) in contact with a magnetic head. For instance, the magnetic recording disk according to the invention can endure rotation of 15,000,000 times, and generally can endure rotation of 20,000,000 times or more.

The examples and the comparison examples of the present invention are given below. In the following examples, the expression "parts" means "parts by weight", unless otherwise specified.

EXAMPLES 1-3 AND COMPARISON EXAMPLES 1-2

| Composition of Magnetic Paint | |
|---|---|
| Ferromagnetic metal powder (Fe—Ni alloy, Ni content: approx. 5 wt. %, specific surface area (S-BET) indicated in Table 1, coercive force (Hc): 1,250 Oe) | 100 parts |
| Vinyl chloride/vinyl acetate copolymer | 10 parts |

| -continued | |
|---|---|
| Composition of Magnetic Paint | |
| Polyester-polyurethane resin | 5 parts |
| Carbon black (mean diameter: 0.1 $\mu$m) | 2 parts |
| Granular $Cr_2O_3$ (mean diameter: 0.3 $\mu$m) | 2.5 parts |
| Isoamyl stearate | 10 parts |
| Butoxyethyl stearate | 1.5 parts |
| Methyl ethyl ketone | 150 parts |
| Cyclohexanone | 150 parts |

The above-listed components were kneaded in a ball mill for 10 hours. To the mixture was added 7 parts of a polyisocyanate compound (trade name: Coronate L, available from Nippon Polyurethane Co., Ltd.) and the mixture was then kneaded for 30 min. to prepare a magnetic paint. The magnetic paint was so coated on both surfaces of a polyethylene terephthalate support having a thickness of 34 $\mu$m that each of the resultant magnetic recording layer after being dried would have thickness of 3.0 $\mu$m.

After the coating was complete, the magnetic recording layer provided on the support was subjected to drying and calendering. From the obtained magnetic recording sheet was then stamped out a disk having a diameter of 5 cm. The disk was encased in a plastic case to obtain a magnetic sheet disk for electronic camera.

The disk was confirmed to have a maximum residual magnetic flux density(Br) of 2,000 G.

Further, a magnetic anisotropy ratio, a C/N ratio and a resistance in continuous rotation were determined in the following manner in a magnetic sheet disk recorder produced by way of trial which was equipped with a sendust head as a magnetic head for recording and a ferrite head for regeneration. The track width was set to 60 $\mu$m.

Magnetic anisotropy

The obtained magnetic sheet disk was rotated at a rate of 3,600 rpm in the disk recorder under the condition that the head was kept in contact with the same track. A signal of 4 MHz was recorded at 40 mA and regenerated to determine the regeneration output. Thus determined output was treated by the following equation to obtain the magnetic anisotropy.

Magnetic Anisotropy(%) = [Maximum Output −

Minimum Output]/[Maximum Output + Minimum Output] × 100

C/N ratio

The C/N ratio was determined on the magnetic sheet disk placed on the disk recorder, the sheet disk having signals recorded under the conditions of rotation rate of 3,600 rpm, recording current of 40 mA, central recording wavelength of 7 MHz, and modulation frequency of 1 MHz.

Resistance in continuous rotation

The magnetic sheet disk was rotated on the disk recorder at a rotation rate of 3,600 rpm under the condition that the same track was kept in contact with the magnetic head. The number of times of rotation when drop-out was first observed was determined on the signals recorded under the conditions of the recording current of 40 mA and central recording wavelength of 7 MHz. The drop-put was observed by means of a drop-out counter VD3D (available from Victor Company of Japan, Ltd.).

The results are set forth in Table 1.

TABLE 1

| | S-BET ($m^2/g$) | Resistance in Rotation $\times 10^4$ | Magnetic Anisotropy % | C/N Ratio |
|---|---|---|---|---|
| Example | | | | |
| 1 | 35 | 3,100 | 8.5 | +2.5 |
| 2 | 47 | 3,220 | 5.5 | +4.0 |
| 3 | 58 | 2,160 | 3.4 | +4.8 |
| Com. Ex. | | | | |
| 1 | 30 | 3,470 | 12.8 | 0 |
| 2 | 68 | 518 | 3.6 | +4.7 |

The results in Table 1 indicate that the disk using a ferromagnetic metal powder of a specific surface area (S-BET) of 30 $m^2/g$ is poor in both the magnetic anisotropy and C/N ratio, although the resistance is high, and that the disk using a ferromagnetic metal powder of a specific surface area (S-BET) of 68 $m^2/g$ is poor in the resistance, although both the magnetic anisotropy and C/N ratio are high.

EXAMPLES 4-6

A magnetic paint was prepared in the same manner as in Example 1 except that a ferromagnetic Fe-Ni (Ni content: approx. 5 wt.%) alloy powder of a specific surface area (S-BET) of 46 $m^2/g$ was employed and that the ester lubrianct of butoxyethyl stearate (1.5 parts) and isoamyl stearate (parts indicated in Table 2) in combination was employed.

The magnetic paint was so coated on both surfaces of a polyethylene terephthalate support having a thickness of 30 μm, dried and calendered in the same manner as in Example 1. From thus obtained magnetic recording sheet was then stamped out a disk having a diameter of 5 cm. The disk was encased in a plastic case to obtain a magnetic sheet disk.

The disks were evaluated on the resistance in continuous rotation in the same manner as in Example 1.

Figure 1:
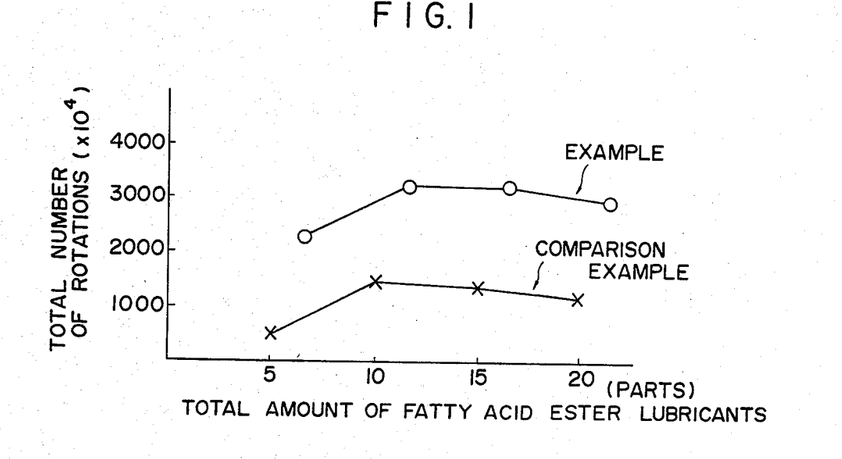
FIGS. 1 and 2 illustrate resistance in the continuous rotation of a magnetic recording disk.

The results are set forth in Table 2 and illustrated in FIG. 1.

COMPARISON EXAMPLES 3-6

A magnetic paint was prepared in the same manner as in Example 4 except that the single ester lubrianct of isoamyl stearate (in an amount of parts indicated in Table 2) was employed.

The magnetic paint was so coated on both surfaces of a polyethylene terephthalate support having a thickness of 30 μm, dried and calendered in the same manner as in Example 1. From thus obtained magnetic recording sheet was then stamped out a disk having a diameter of 5 cm. The disk was encased in a plastic case to obtain a magnetic sheet disk.

The disks were evaluated on the resistance in continuous rotation in the same manner as in Example 1.

The results are set forth in Table 2 and illustrated in FIG. 1.

TABLE 2

| | Amount of Ester Lubricant (parts) | | |
|---|---|---|---|
| | Isoamyl Stearate | Butoxyethyl Stearate | Resistance ($\times 10^4$) |
| Example | | | |
| 4 | 5 | 1.5 | 2,300 |
| 2 | 10 | 1.5 | 3,220 |
| 5 | 15 | 1.5 | 3,200 |
| 6 | 20 | 1.5 | 3,000 |
| Com. Ex. | | | |
| 3 | 5 | — | 600 |
| 4 | 10 | — | 1,500 |
| 5 | 15 | — | 1,500 |
| 6 | 20 | — | 1,400 |

The results of Example 2 are transferred from the aforementioned Example 2.

From the results given in Table 2 and in FIG. 1, it has been confirmed that the combination of isoamyl stearate and butoxyethyl stearate is prominently effective in the improvement of resistance in the rotation.

EXAMPLES 7-9

A magnetic paint was prepared in the same manner as in Example 1 except that a ferromagnetic Fe-Ni(Ni content: approx. 5 wt.%) alloy powder of a specific surface area (S-BET) of 47 $m^2/g$ was employed and that the ester lubrianct of isoamyl stearate (5 parts) and butoxyethyl stearate (parts indicated in Table 3) in combination was employed.

The magnetic paint was so coated on both surfaces of a polyethylene terephthalate support having a thickness of 30 μm, dried and calendered in the same manner as in Example 1. From thus obtained magnetic recording sheet was then stamped out a disk having a diameter of 5 cm. The disk was encased in a plastic case to obtain a magnetic sheet disk.

The disks were evaluated on the resistance in continuous rotation in the same manner as in Example 1.

Figure 2:
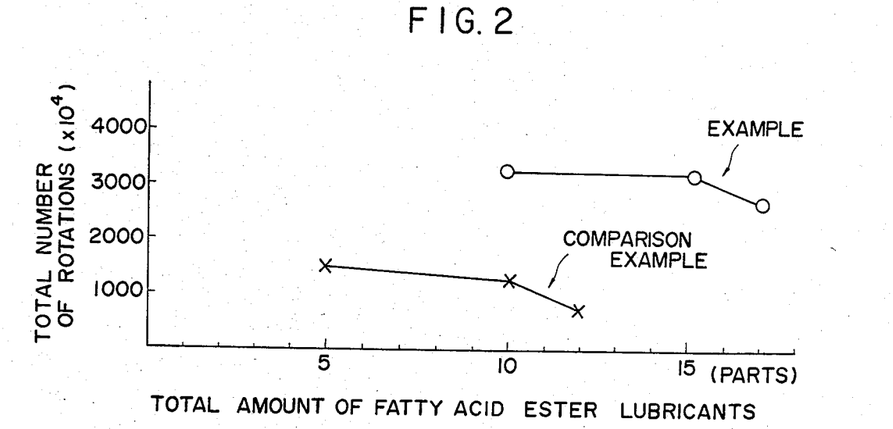

The results are set forth in Table 3 and illustrated in FIG. 2.

COMPARISON EXAMPLES 7-9

A magnetic paint was prepared in the same manner as in Example 7 except that the single ester lubrianct of butoxyethyl stearate (in an amount of parts indicated in Table 3) was employed.

The magnetic paint was so coated on both surfaces of a polyethylene terephthalate support having a thickness of 30 μm, dried and calendered in the same manner as in Example 1. From thus obtained magnetic recording sheet was then stamped out a disk having a diameter of 5 cm. The disk was encased in a plastic case to obtain a magnetic sheet disk.

The disks were evaluated on the resistance in continuous rotation in the same manner as in Example 1.

The results are set forth in Table 3 and illustrated in FIG. 2.

TABLE 3

| | Amount of Ester Lubricant (parts) | | |
|---|---|---|---|
| | Isoamyl Stearate | Butoxyethyl Stearate | Resistance ($\times 10^4$) |
| Example | | | |
| 7 | 5 | 5 | 3,200 |
| 8 | 5 | 10 | 3,150 |
| 9 | 5 | 12 | 2,750 |
| Com. Ex. | | | |
| 7 | — | 5 | 1,500 |
| 8 | — | 10 | 1,250 |
| 9 | — | 12 | 750 |

From the results given in Table 3 and in FIG. 2, it has been confirmed that the combination of isoamyl stearate and butoxyethyl stearate is prominently effective in the improvement of resistance in the rotation.

EXAMPLES 10–13 AND COMPARISON EXAMPLES 10–11

A magnetic paint was prepared in the same manner as in Example 1 except that a ferromagnetic Fe-Ni(Ni content: approx. 5 wt.%) alloy powder of a specific surface area (S-BET) of 47 m$^2$/g was employed and that the ester lubrianct of isoamyl stearate and butoxyethyl stearate in parts indicated in Table 4 (total amount: 11.5 parts) in combination was employed.

The magnetic paint was so coated on both surfaces of a polyethylene terephthalate support having a thickness of 30 μm, dried and calendered in the same manner as in Example 1. From thus obtained magnetic recording sheet was then stamped out a disk having a diameter of 5 cm. The disk was encased in a plastic case to obtain a magnetic sheet disk.

The disks were evaluated on the resistance in continuous rotation in the same manner as in Example 1.

The results are set forth in Table 4.

TABLE 4

| | Amount of Ester Lubricant (parts) | | |
|---|---|---|---|
| | Isoamyl Stearate | Butoxyethyl Stearate | Resistance (× 10$^4$) |
| Example | | | |
| 10 | 2.3 | 9.2 | 2,200 |
| 11 | 4.6 | 6.9 | 2,750 |
| 12 | 6.9 | 4.6 | 2,700 |
| 13 | 10.9 | 0.6 | 2,300 |
| Com. Ex. | | | |
| 10 | 1.15 | 10.35 | 950 |
| 11 | 11.2 | 0.3 | 1,985 |

From the results given in Table 4, it has been confirmed that the combination of isoamyl stearate and butoxyethyl stearate both in amounts within the specific ranges is prominently effective in the improvement of resistance in the rotation.

EXAMPLE 14

A magnetic paint was prepared in the same manner as in Example 1 except that a ferromagnetic Fe-Ni(Ni content: approx. 5 wt.%) alloy powder of a specific surface area (S-BET) of 45 m$^2$/g was employed.

The magnetic paint was so coated on one surface of a polyethylene terephthalate support having a thickness of 10 μm, to form a coated layer having a thickness of 3.0 μm after being dried. The coated layer was then subjected to orienting treatment, dried and calendered in the same manner as in Example 1.

Thus obtained magnetic recording sheet was then slitted to give video tapes (VHS type) having a width of ½ inch.

The obtained video tape was run in contact with a ferrite head installed in a video tape recorder V-500D (tradename of Toshiba Corp., Japan). The running speed was set to a half of the ordinary running speed. The number of times at which the clogging of the magnetic head (namely, clogging times) was observed was detected. The video tape prepared as above gave no clogging on the magnetic head even after the video tape-running was repeated as many as 200 times.

In the above running procedure, the regeneration output (video output) was 5 dB at 1 μm. This value is a relative value based on the regeneration output of Super HG-T-120 (tradename of a video tape of Fuji Photo Film Co., Ltd.) is 0 dB.

Further, the number of drop-out at 15 μs occurring in a minute was counted by means of a drop-out counter VD-3D (available from Vector Company of Japan, Ltd.). The number of the drop-out was 4.

The above-described results indicates that the obtained video tape is of high practical value.

EXAMPLES 15–17 AND COMPARISON EXAMPLES 12–13

| Composition of Magnetic Paint | |
|---|---|
| Ferromagnetic metal powder (Fe—Ni alloy, Ni content: approx. 5 wt. %, specific surface area (S-BET) indicated in Table 1, coercive force (Hc): 1,310 Oe), saturation magnetic moment: 135 emu/g) | 100 parts |
| Vinyl chloride/vinyl acetate copolymer | 10 parts |
| Polyester-polyurethane resin | 5 parts |
| Butyl stearate | 10 parts |
| Butoxyethyl stearate | 2 parts |
| Carbon black (mean diameter: 0.1 μm) | 1 part |
| Cr$_2$O$_3$ powder (mean diameter: 0.3 μm) | 2.5 parts |
| Methyl ethyl ketone | 150 parts |
| Cyclohexanone | 150 parts |

The above-listed components were kneaded in a ball mill for 10 hours. To the mixture was added 7 parts of a polyisocyanate compound (trade name: Coronate L, available from Nippon Polyurethane Co., Ltd.) and the mixture was then kneaded for 30 min. to prepare a magnetic paint. The magnetic paint was so coated on both surfaces of a polyethylene terephthalate support (thickness: 34 μm, center line average height (Ra): 0.015 μm, determined according to the procedure defined in JIS-B-0601 at a cut-off value of 0.025) that each of the resultant magnetic recording layer after being dried would have thickness of 4.0 μm.

After the coating was complete, the magnetic recording layer provided on the support was subjected to drying and calendering. From the obtained magnetic recording sheet was then stamped out a disk having a diameter of 4.7 cm. The disk was encased in a plastic case to obtain a magnetic sheet disk for electronic camera.

The magnetic sheet disk was determined on square-ness ratio to give an orientation ratio (minimum value of suqareness ratio/maximum value of squreness ratio).

The results are set forth in Table 5. The relationship between the orientation ratio and the specific surface area is given in FIG. 3.

TABLE 5

| | S-BET (m$^2$/g) | Orientation Ratio |
|---|---|---|
| Example | | |
| 15 | 37 | 0.90 |
| 16 | 45 | 0.94 |
| 17 | 55 | 0.96 |
| Com. Ex. | | |
| 12 | 25 | 0.73 |
| 13 | 32 | 0.80 |

Figure 3:
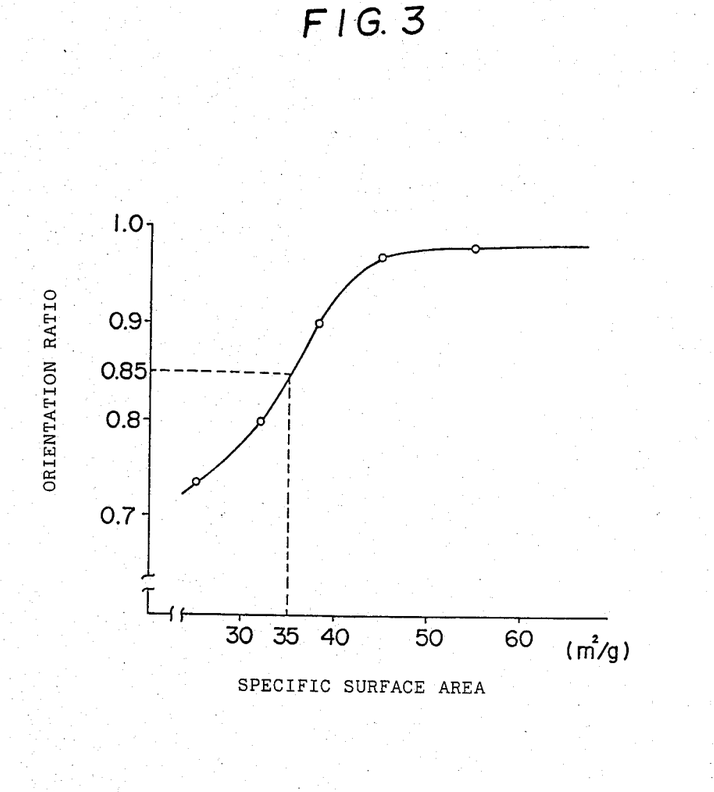
FIG. 3 illustrates a relationship between the orientation ratio and the specific surface area of a magnetic recording disk.

The results in Table 5 and FIG. 3 teach that the orientation ratio is 0.85 where the specific surface ratio (S-BET) is 35 m$^2$/g, and that orientation ratio is kept at the almost same level where the specific surface ratio exceeds 45 m²/g.

EXAMPLE 18 AND COMPARISON EXAMPLE 14

In this Example 18, the magnetic sheet disk obtained in Example 16 was determined with respect to the center line average height (Ra) of the magnetic recording layer and S/N ratio (or C/N ratio).

In this Comparison Example 14, a magnetic sheet disk was prepared in the same manner as in Example 16 except that the magnetic paint coated on the support was subjected to random orientation treatment. The resulting magnetic sheet disk was determined with respect to the center line average height (Ra) of the magnetic recording layer and S/N ratio (or C/N ratio).

The center line average height (Ra) of the magnetic recording layer was determined by means of a three-dimensional roughness measureing device SE-3AK (available from Kosaka Laboratories, Co., Ltd., Japan). The S/N ratio was determined in the aforementioned manner stated for the C/N ratio.

The results are set forth in Table 6.

TABLE 6

|  | Center Line Average Height (Ra) (μm) | S/N Ratio (dB) |
|---|---|---|
| Example 18 | 0.012 | 0 |
| Com. Ex. 14 | 0.031 | −3.5 |

It has been confirmed that the center line average height indicative of the surface roughness increases and the S/N ratio increases, in the case that the magnetic orientation treatment is applied to a magnetic recording layer.

EXAMPLES 19-20 AND COMPARISON EXAMPLES 15-16

A magnetic paint was prepared in the same manner as in Example 16 except that the ester lubrianct of butyl stearate and butoxyethyl stearate in parts indicated in Table 7 in combination was employed.

The magnetic paint was so coated on both surfaces of a polyethylene terephthalate support having a thickness of 30 μm, dried and calendered in the same manner as in Example 16. From thus obtained magnetic recording sheet was then stamped out a disk having a diameter of 5 cm. The disk was encased in a plastic case to obtain a magnetic sheet disk.

The disks were evaluated on the resistance in continuous rotation in the same manner as in Example 1.

The results are set forth in Table 7.

TABLE 7

| | Amount of Ester Lubricant (parts) | | |
|---|---|---|---|
| | Butyl Stearate | Butoxyethyl Stearate | Resistance (× 10⁴) |
| Example | | | |
| 19 | 10 | 2 | 3,150 |
| 20 | 5 | 5 | 2,730 |
| Com. Ex. | | | |
| 15 | 3 | — | 1,040 |
| 16 | — | 3 | 870 |

From the results given in Table 7, it has been confirmed that the combination of butyl stearate and butoxyethyl stearate is prominently effective in the improvement of resistance in the rotation.

We claim:

1. A magnetic recording medium comprising a nonmagnetic support and a magnetic recording layer provided on said support, said magnetic recording layer comprising a nonmagnetic inorganic powder and a ferromagnetic metal powder of a specific surface area in the range of 35-65 m²/g dispersed in a binder, which is characterized in that said magnetic recording layer contains an alkyl ester of a fatty acid and an alkoxyalkyl ester of a fatty acid in amounts in the ranges of 5-15 wt.% and 0.5-10 wt.%, respectively, based on the amount of the ferromagnetic metal powder.

2. The magnetic recording medium as claimed in claim 1, wherein said alkyl ester of a fatty acid and said alkoxyalkyl ester of a fatty acid are contained in the magnetic recording layer in amounts in the ranges of 7-13 wt.% and 0.5-5 wt.%, respectively, based on the amount of the ferromagnetic metal powder.

3. The magnetic recording medium as claimed in claim 1, wherein the amount of said alkyl ester of a fatty acid is larger than the amount of said alkoxyalkyl ester of a fatty acid.

4. The magnetic recording medium as claimed in claim 3, wherein the amount of said alkyl ester of a fatty acid is as much as twice or more larger than the amount of said alkoxyalkyl ester of a fatty acid.

5. The magnetic recording medium as claimed in any one claim of claims 1 to 3, wherein said alkylester of a fatty acid has the following formula:

wherein $R^1$ is a saturated or unsaturated alkyl group having 12-24 carbon atoms and $R^2$ is a saturated or unsaturated alkyl group having 2-8 carbon atoms.

6. The magnetic recording medium as claimed in any one claim of claims 1 to 3, wherein said alkoxyalkylester of a fatty acid has the following formula:

wherein $R^3$ is a saturated or unsaturated alkyl group having 12-24 carbon atoms, $R^4$ is a saturated or unsaturated alkyl group having 2-6 carbon atoms and $R^5$ is a saturated or unsaturated alkyl group having 2-8 carbon atoms.

7. The magnetic recording medium as claimed in any one claim of claims 1 to 3, wherein said nonmagnetic inorganic powder is a powder of a material selected from the group consisting of α-alumina, chromic oxide and α-iron oxide.

8. The magnetic recording medium as claimed in any one claim of claims 1 to 3, wherein the medium is in the form of a disk.

9. The magnetic recording medium as claimed in any one claim of claims 1 to 3, wherein the medium is in the form of a continuous tape.

10. A process for the preparation of a magnetic recording disk which comprises coating a magnetic paint comprising a ferromagnetic metal powder of a specific surface area in the range of 35-65 m²/g, a binder, a solvent, an alkyl ester of a fatty acid in an amount of in the range of 5-15 wt.% and an alkoxyalkyl ester of a fatty acid in an amount in the ranges of 0.5-10 wt.%, the amount being based on the amount of the ferromagnetic metal powder, on a nonmagnetic support to form a coated layer, and drying the coated layer without subjecting it to magnetic orienting treatment.

11. The magnetic recording disk as claimed in claim 10, wherein the ratio of the amounts of said alkyl ester of a fatty acid and said alkoxyalkyl ester of a fatty acid ranges from 10:1 to 10:10.

12. The magnetic recording disk as claimed in claim 10 or 11, wherein said alkylester of a fatty acid has the following formula:

$$R^1-\overset{\overset{O}{\|}}{C}-O-R^2$$

wherein $R^1$ is a saturated or unsaturated alkyl group having 12-24 carbon atoms and $R^2$ is a saturated or unsaturated alkyl group having 2-8 carbon atoms.

13. The magnetic recording disk as claimed in claim 10 or 11, wherein said alkoxyalkylester of a fatty acid has the following formula:

$$R^3-\overset{\overset{O}{\|}}{C}-O-R^4-O-R^5$$

wherein $R^3$ is a saturated or unsaturated alkyl group having 12-24 carbon atoms, $R^4$ is a saturated or unsaturated alkyl group having 2-6 carbon atoms and $R^5$ is a saturated or unsaturated alkyl group having 2-8 carbon atoms.

* * * * *